United States Patent [19]

Lawrence

[11] Patent Number: 5,730,812
[45] Date of Patent: Mar. 24, 1998

[54] METHOD OF MANUFACTURING EJECTOR PIN SLEEVES

[75] Inventor: David E. Lawrence, East Point, Mich.

[73] Assignee: D-M-E Company, Madison Heights, Mich.

[21] Appl. No.: 858,744

[22] Filed: May 19, 1997

[51] Int. Cl.⁶ .............................. C21D 9/08; B29C 1/00; B29C 7/00
[52] U.S. Cl. .................. 148/590; 148/593; 72/340; 72/352; 72/367
[58] Field of Search ..................... 72/340, 352, 367, 72/370; 148/590, 593; 425/350, 351, 424, 436 R, 556; 249/67, 74

[56] References Cited

U.S. PATENT DOCUMENTS

| | | |
|---|---|---|
| 3,963,209 | 6/1976 | Muller . |
| 4,645,446 | 2/1987 | Hehl . |
| 5,472,334 | 12/1995 | Takahashi . |
| 5,546,647 | 8/1996 | Pruna ........................... 29/527.4 |

FOREIGN PATENT DOCUMENTS 63-230824  9/1988  Japan .

*Primary Examiner*—Deborah Yee
*Attorney, Agent, or Firm*—Stephen H. Friskney

[57] ABSTRACT

A method is disclosed for manufacturing ejector sleeves from tubular stock. In particular, the method includes the following steps or operations: (a) cutting the tube stock to length, (b) enlarging a portion of the inside diameter of the sleeve to provide a clearance diameter, (c) rough-sizing a close-fitting inner diameter, (d) optionally semi-finishing the outside diameter of the sleeve, (e) hardening and straightening the sleeve, (f) final sizing of the outside diameter while maintaining concentricity with the inside diameters, (g) finishing the end face of the sleeve adjacent the close-fitting diameter, (h) final sizing of the close-fitting inner diameter while maintaining concentricity with the outside diameter, (i) forming a head on the sleeve by heating and forging to a predetermined size, (j) optional annealing and refinishing of the head for purposes of hardness or dimensional modification, or improving surface finish.

8 Claims, 1 Drawing Sheet

METHOD OF MANUFACTURING EJECTOR PIN SLEEVES

BACKGROUND OF THE INVENTION

1. Field of the Invention

The present invention relates generally to components used in injection mold or die construction and, more particularly, to a process for manufacturing injection molding ejector sleeves from pre-formed tubular material.

2. Description of the Related Art

Ejector sleeves are typically used to guide ejector pins in plastics molds, die casting dies and other applications, thereby facilitating ejection of the finished part from the mold. In particular, after the molding process is complete and the mold opens, the ejection system moves the ejector pins (or sleeves) linearly to push on the molded part so that it is released from the mold. Ejector sleeves are primarily used in conjunction with an ejector pin to serve as a guiding mechanism, but are also directly used as a part ejector around a boss or mold protuberance.

Ejector sleeves have traditionally been produced from solid bar or rod material. In some cases, the manufacturing process begins with a solid rod having a head already formed on the blank. The subsequent manufacturing steps include machining the required clearance and close-fitting inside diameters into the rod blank, then truing the outside diameter, followed by application of a hardening process. If required, additional finishing is then performed to provide an end product of the desired overall size, internal configuration, hardness and wearability characteristics.

Production of an ejector sleeve from solid bar stock is costly due to the time and material loss associated with machining the internal clearance diameter as well as the close-fitting inner diameter. In addition, the extensive machining that occurs during the manufacturing process may result in distortion of the overall shape of the ejector sleeve, requiring subsequent straightening and/or other processing to achieve the desired final geometry.

More recently, other methods of manufacturing ejector sleeves have been proposed that start with tubular stock (rather than a solid rod). One method starts with a tube having an inside diameter corresponding to the internal clearance diameter, then hammers or otherwise reforms the close-fitting (smaller) end to the approximate size of the desired inside diameter (which is later machined to the final dimension). However, for this prior art process, there are rather narrow limits on the amount that the inner diameter of the tube can be reduced by mechanically deforming without adversely affecting the properties of the material. This aspect of the prior art process limits the range of sizes and configurations of ejector sleeves that can be manufactured with a given size tube.

SUMMARY OF THE INVENTION

An object of the invention is to provide an economical process for manufacturing a wide range of sizes of ejector sleeves from a given size of tubular stock. In particular, the process includes a series of operations applied to a length of tubing, pre-formed from any one of a variety of appropriate materials, in order to produce an ejector sleeve having the desired inside diameters and overall length. An ejector sleeve manufactured according to the invention can be used in conjunction with an ejector pin as a guiding mechanism or used as a part ejector around a boss or mold protuberance. Although the cost for material that is pre-formed as a tube tends to be more, on a pound per pound basis, than solid bar or rod stock, the increased efficiencies of the disclosed process more than offset the higher price of tube material.

In particular, the present invention involves a process for manufacturing ejector sleeves from tubular stock that includes the following steps or operations: (a) cutting the tubular stock to length, (b) enlarging a portion of the inside diameter of the sleeve to provide a clearance diameter, (c) rough-sizing the close-fitting inner diameter, (d) optionally rough-sizing the outside diameter of the sleeve, (e) hardening and straightening the sleeve, (f) final sizing of the outside diameter while maintaining concentricity with the inside diameters, (g) finishing the end of the face of the close-fitting end of the sleeve, (h) final sizing of the close-fitting inner diameter while maintaining concentricity with the outside diameter, (i) forming a head on the sleeve by heating and forging to a predetermined size, and (j) optional annealing and refinishing of the head for purposes of hardness or dimensional modification, or improving surface finish.

Accordingly, the method of the invention offers cost reduction over prior art methods for producing ejector sleeves from rod or bar stock, as well as providing manufacturing flexibility when compared to other methods of manufacturing ejector sleeves from tube stock that involve mechanically reforming the close-fitting end. In particular, the present invention enables production of a wider range of ejector sleeves sizes, for both clearance diameters as well as close-fitting diameters, from the same sized tubular stock, thereby reducing the number of sizes of pre-formed tubes that need to be maintained in inventory. The advantages of increased production efficiency and the ability to expand the range of ejector sleeves produced from a single size of tube stock result in improved overall productivity and reduced manufacturing costs when compared to prior art methods.

DESCRIPTION OF THE PREFERRED EMBODIMENT

Figure 1A:
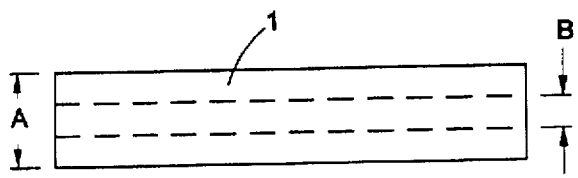
FIG. 1a through FIG. 1h illustrate, in the preferred order, the steps for manufacturing an ejector pin sleeve according to the present invention; in particular, those steps that change the dimensional detail of the sleeve.

The preferred method for manufacturing an ejector sleeve begins with selecting tubular stock 1 of the desired material in a size that comes closest the desired size of the finished sleeve. Since the diameters of the tube will not be mechanically reformed, total machining time can be minimized by selecting a pre-formed tube that has an outer diameter A slightly larger than the finished outer diameter of the sleeve, and an inner diameter B that is slightly smaller than the finished dimension of the close-fitting diameter. The first operation is to cut off the selected tube stock to an appropriate length that includes a stock allowance for subsequent finishing, such as forming a head, as illustrated by FIG. 1a.

Figure 1B:
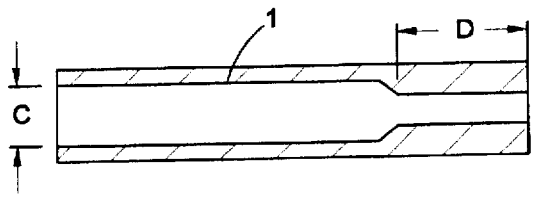

The second operation involves machining the clearance diameter C in the sleeve to the desired size over the size of the close-fitting diameter, see FIG. 1b. The purpose of the clearance diameter is to allow unobstructed operation of any ejector pin used in conjunction with the sleeve and to minimize the overall length D of the more precisely finished close-fitting inside diameter.

Figure 1C:
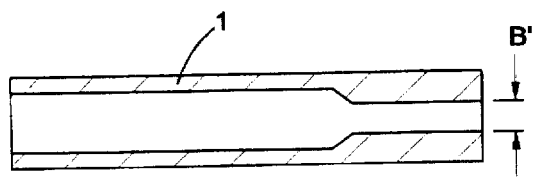

The third step is a machining operation on the close-fitting inside diameter to bring it to a dimension B' that is slightly undersize to allow for final finishing, see FIG. 1c. In performing this step, it is important to make sure that concentricity with the previously machined clearance diameter is maintained; this can be accomplished, for example, by using a tool that pilots on designated reference diameter. In certain instances, this step may not be required depending upon the inner diameter of the tubing material selected; i.e., it may already be "slightly undersize."

Figure 1D:
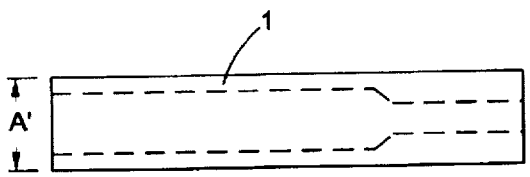

The fourth operation on the ejector sleeve is to reduce the outside diameter of the sleeve to a dimension A' that is slightly oversize, see FIG. 1d. As noted for the third operation, it is likewise important to perform this step in a manner that ensures concentricity between the outside diameter, the clearance diameter and the close-fitting diameter of the sleeve. Here again, it should be noted that this step may not be required depending upon the outer diameter of the tubing material selected; i.e., it may already be "slightly oversize."

The next operation includes a hardening treatment and/or straightening process for the sleeve (not shown). Depending on the product specifications, the details of this operation will vary, according to procedures generally known in the art.

Figure 1E:
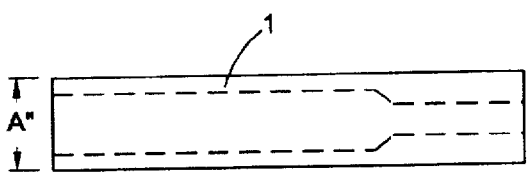

The sixth operation involves machining the outside diameter of the sleeve to produce the finish diameter A", see FIG. 1e. Here again, when sizing the outside diameter of the sleeve, it is important to maintain concentricity of the outer diameter with the clearance and close-fitting inside diameters.

Figure 1F:
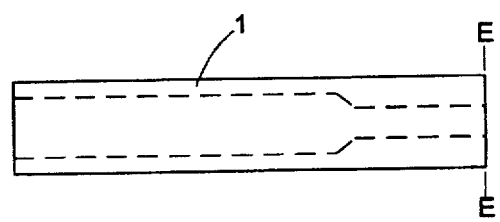

The seventh operation is final finishing of the end face E—E of the close-fitting inner diameter of the sleeve, see FIG. 1f.

Figure 1G:
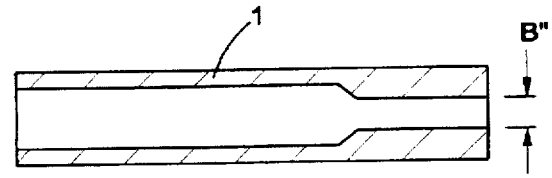

The eighth operation is to machine the close-fitting inside diameter of the sleeve to the finish diameter B" (see FIG. 1g), while maintaining concentricity with the outside diameter and the inside diameter used for clearance.

Figure 1H:
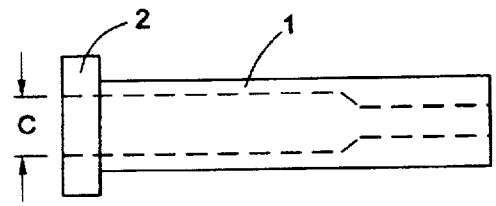

The final operation involves forming a head 2 on the clearance diameter end of the sleeve (see FIG. 1h), when required. The head is formed by heating and forging, or otherwise reforming a given length of the sleeve 1 into the shape of a head 2 having a predetermined geometry. The inside clearance diameter C of the ejector sleeve is maintained (prevented from distorting) during this head forming process by a die that displaces material from the inside diameter adjacent the head 2 and/or a filler material that is subsequently removed.

Optionally, an additional operation may be performed on the head 2 formed at the end of the ejector sleeve to produce a critical dimension or surface polish. For example, annealing and refinishing can be performed for purposes of hardness or dimensional modification, or improved surface finish.

Although the preferred embodiment of the present invention has been illustrated and described in some detail, it will be apparent to those skilled in the art that various changes and modifications can be made without departing from the spirit of the present invention. For example, it is contemplated that tubing stock could be purchased in which both the outer diameter and close-fitting inner diameter are appropriately sized so that rough-sizing operations are not necessary. In addition, the operations that require machining of the sleeve may involve any machining method suitable for achieving the desired results, as generally known in the art; for example, drilling, boring, grinding, reaming, etc. It is, therefore, intended that the appended claims encompass all such changes and modifications that fall within the scope of the present invention.

What is claimed is:

1. A method for manufacturing an ejector sleeve from pre-formed tubular material having an outer diameter slightly larger than a finish diameter and an inner diameter slightly smaller than a close-fitting diameter, comprising the steps of: cutting the tubular material into a sleeve of predetermined length; enlarging a portion of the length of the inner diameter of the sleeve to provide a clearance diameter, leaving the remaining portion of the inner diameter slightly smaller than the close-fitting diameter; performing a hardening operation on the tubular sleeve; machining the outside diameter to produce the finish diameter; finishing the end face of the sleeve adjacent the smaller inner diameter; and machining the smaller inner diameter to produce the close-fitting diameter.

2. The method for manufacturing an ejector sleeve as set forth in claim 1, further comprising the step of forming a head on the sleeve at the end adjacent the clearance diameter by heating and forging the head to a predetermined size.

3. A method for manufacturing an ejector sleeve from pre-formed tubular material having an outer diameter larger than a finish diameter and an inner diameter smaller than a close-fitting diameter, comprising the steps of: (a) cutting the tubular material into a sleeve of predetermined length, (b) enlarging a portion of the length of the inner diameter of the sleeve to provide a clearance diameter, (c) machining the remaining portion of the inner diameter of the sleeve to a dimension slightly smaller than the close-fitting inner diameter, (d) performing a hardening operation on the tubular sleeve, (e) machining the outside diameter to produce the finish diameter, (f) finishing the end face of the sleeve adjacent the smaller inner diameter, and (g) machining the smaller inner diameter to produce the close-fitting diameter.

4. The method for manufacturing an ejector sleeve as set forth in claim 3, further comprising the step of machining the outer diameter of the sleeve to a dimension slightly larger than the finish diameter.

5. The method for manufacturing an ejector sleeve as set forth in claim 3 or 4, further comprising the step of forming a head on the sleeve at the end adjacent the clearance diameter by heating and forging the head to a predetermined size.

6. The method for manufacturing an ejector sleeve as set forth in claim 5 further comprising the step of processing the head of the sleeve to make it conform to desired dimensional, finish and hardness characteristics.

7. A method for manufacturing an ejector sleeve from pre-formed tubular material having an outer diameter larger than a finish diameter and an inner diameter smaller than a close-fitting diameter, comprising the steps of:

(a) cutting the tubular material into a sleeve of predetermined length;

(b) enlarging a portion of the length of the inner diameter of the sleeve to provide a clearance diameter;

(c) rough-sizing the remaining portion of the inner diameter of the sleeve to a dimension slightly smaller than the close-fitting diameter, (d) rough-sizing the outside diameter of the sleeve to a dimension slightly larger than the finish diameter, (e) performing a hardening operation on the tubular sleeve, (f) machining the outside diameter to produce the finish diameter, (g) finishing the end face of the sleeve adjacent the smaller inner diameter, (h) machining the smaller inner diameter to produce the close-fitting diameter, and (i) forming a head on the sleeve at the end adjacent the clearance diameter by heating and forging the head to a predetermined size.

8. The method for manufacturing an ejector sleeve as set forth in claim 7 further comprising the step of processing the head of the sleeve to make it conform to desired dimensional, finish and hardness characteristics.

* * * * *